United States Patent
Lu

(10) Patent No.: US 11,998,842 B2
(45) Date of Patent: Jun. 4, 2024

(54) METHOD FOR RENDERING AN ENVIRONMENT IN AN ELECTRONIC GAME

(71) Applicant: Garena Online Private Limited, Singapore (SG)

(72) Inventor: Chen Lu, Singapore (SG)

(73) Assignee: Garena Online Private Limited, Singapore (SG)

( * ) Notice: Subject to any disclaimer, the term of this patent is extended or adjusted under 35 U.S.C. 154(b) by 82 days.

(21) Appl. No.: 17/764,834

(22) PCT Filed: Dec. 17, 2021

(86) PCT No.: PCT/SG2021/050794
§ 371 (c)(1),
(2) Date: Mar. 29, 2022

(87) PCT Pub. No.: WO2022/255938
PCT Pub. Date: Dec. 8, 2022

(65) Prior Publication Data
US 2023/0090820 A1 Mar. 23, 2023

(30) Foreign Application Priority Data
Jun. 1, 2021 (SG) .......................... 10202105794Y

(51) Int. Cl.
*A63F 13/52* (2014.01)
*G06T 15/00* (2011.01)

(52) U.S. Cl.
CPC .............. *A63F 13/52* (2014.09); *G06T 15/00* (2013.01)

(58) Field of Classification Search
None
See application file for complete search history.

(56) References Cited

U.S. PATENT DOCUMENTS

| 5,815,156 | A | 9/1998 | Takeuchi |
| 6,487,565 | B1 | 11/2002 | Schechter et al. |
| 2005/0264567 | A1 | 12/2005 | Sommers |
| 2016/0271499 | A1* | 9/2016 | Higo ..................... A63F 13/798 |
| 2018/0093193 | A1* | 4/2018 | Tamura ................... A63F 13/44 |
| 2018/0326303 | A1* | 11/2018 | Fukuda ............... A63F 13/5378 |
| 2019/0299097 | A1 | 10/2019 | Hadjadj et al. |
| 2020/0406127 | A1* | 12/2020 | Asano ..................... A63F 13/35 |

* cited by examiner

*Primary Examiner* — Jason T Yen
(74) *Attorney, Agent, or Firm* — David R. Stevens; Stevens Law Group

(57) ABSTRACT

A method for rendering an environment in an electronic game is disclosed. The game comprises a plurality of sessions and the method comprises, during an initiation phase, generating a map for all sessions of the game and dividing the map up into a plurality of sub-regions, each of the sub-regions being allocated to at least one session; and for each session, rendering a current sub-region of the map wherein the current sub-region corresponds to a current session.

16 Claims, 3 Drawing Sheets

METHOD FOR RENDERING AN ENVIRONMENT IN AN ELECTRONIC GAME

FIELD OF THE INVENTION

The invention pertains to electronic games, and in particular, rendering a playing environment for electronic games.

BACKGROUND

Almost all electronic games comprise a visual element where changes in the game result in changes to that visual element. Many modern games consist of a complex environment through which a user moves an avatar, either viewing the environment from the perspective of the avatar, or viewing a camera-angle view of the avatar's movement through that environment.

Since the user does not view the entire environment of the game at once, it makes sense to display to the user only that portion of the environment pertaining to the current gameplay. For example, where the game involves showing the user the view-point of their avatar, only the parts of the environment which are visible to the avatar at any particular time need be displayed to the user.

The visual elements which are displayed to the user during gameplay are generated algorithmically. In other words, the information necessary to generate the visual elements are stored in the computer and are then processed by one or more processing units to generate the pixels which are displayed on the a display seen by the user. This is necessary to allow a user to interact with that environment (which may include avatars controlled by other users).

In general, the term "rendering" is used to describe to the process whereby stored information is converted to pixel information which can then be displayed to the user. Generally speaking, the more detailed the pixel information displayed to the user, the more complex the calculations are which are needed to obtain that information.

Some of these calculations used in the rendering process may be conducted during gameplay so that aspects of the pixel information are generated as the user interacts with the game. However, if these calculations are too complex, then the game may have to wait for the calculations to continue before being able to display the relevant information. This would cause unacceptable pauses and delays during the playing of the game, significantly affecting the user experience.

To avoid such delays, portions of the information can be pre-calculated during a loading phase. For example, many games employ the concept of 'levels' or sessions where the overall game is divided up into different portions. As the gameplay progresses, only the information for the current level will be loaded by the computer and portions of that information processed to avoid having to process the entire game information in a single step. In this case, the game may undergo a loading phase at the start of every level where parts of the visual information relevant to that level is rendered. This may result in a number of smaller pauses in the game at times when a corresponding narrative is changing which not only reduces the waiting time for the user at any particular point, but may also allow for the placement of those pauses at a time which is less jarring to narrative and overall game experience.

There are many approaches to rendering pixel information. For example, the game environment may comprise a map having three dimensional information such as contours and geographical features including vegetation, landscaping, sky, etc. A serious of objects may be placed on the map such as buildings, vehicles, animals and non-playing characters (NPCs). A basic co-ordinate representation of a scene may be generated as a wire-frame representation using polygon outlines. As more and more detail is required (for example when a user's viewpoint is moved closer and closer to an object (for example), the number of polygons used to represent that object is increased, the computer iteratively filling in detail as required. At the same time the visual characteristics of each polygon including texture, colour, pattern and other visual characteristics can be determined.

So, for example, the rendering used at the beginning of a level may comprise generating a wire frame for the level using a terrain map and a library of objects where certain of the available objects have been assigned positions on the map. Then during gameplay the polygons are filled in according to various lighting characteristics and assigned characteristics for those polygons which determine their visual character.

Many modern haves are multi-player games where a number of users will interact with one another on a common map. Due to the number of users involved and delays in transmitting information over networks, such games may have a lower margin for delay than other games.

SUMMARY OF INVENTION

According to a first aspect of the present invention, a method for rendering an environment in an electronic game is described, the game comprising a plurality of sessions, the method comprising:
  during an initiation phase, generating a map for all sessions of the game and dividing the map up into a plurality of sub-regions, each of the sub-regions being allocated to at least one session;
  for each session, rendering a current sub-region of the map wherein the current sub-region corresponds to a current session; and
  for each session subsequent to a first session, the step of rendering the current sub-region comprises determining a difference between the current sub-region and a previous sub-region, and rendering the current sub-region according to the difference.

There may be a one-to-one correlation between sub-regions and sessions so that each session is allocated a unique sub-region.

The step of rendering the current sub-region of the map may comprise populating the current sub-region with one or more objects.

The sessions may occur sequentially so that a second session occurs after a first session. The second session may be a second session out of all sessions or any subsequent session.

Where the step of rendering the current sub-region comprises populating the current sub-region with one or more objects, then only the objects which have changed between the previous session and the current session may be rendered.

The objects which have changed may comprise new objects and/or old objects with different details.

Details of objects may include one or more of level of detail, texture, pattern, shadows, motion blur and any of the other known rendering properties which may apply to the object.

An object may comprise an animate or inanimate object.

The step of rendering the current sub-region may comprise unloading unused objects.

The map may comprise a skybox and a terrain together with indications of placements of objects on the terrain. A terrain may comprise a description of a landscape used in the game and may be described with contours. Certain aspects of the map may be predetermined whereas further aspects may be generated randomly.

The descriptors of objects on the terrain may describe one or more of: type of the object; dimensions of the object; size of the object; location of the object; orientation of the object; visual characteristics of the object such as colour, shade, pattern, reflectivity, texture etc., and animation characteristics of the object.

The sub-regions may be adjacent to one another. Users may be discouraged from accessing a sub-region which is not allocated to the current session. The users may be discouraged by inflicting damage on their avatar if the users move their avatar past a predetermined border in the current sub-region.

Other aspects of the invention will become clearer from the following detailed description of some preferred embodiments thereof.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to illustrate various embodiments, by way of example only, and to explain various principles and advantages in accordance with a present embodiment.

DETAILED DESCRIPTION

Figure 1:
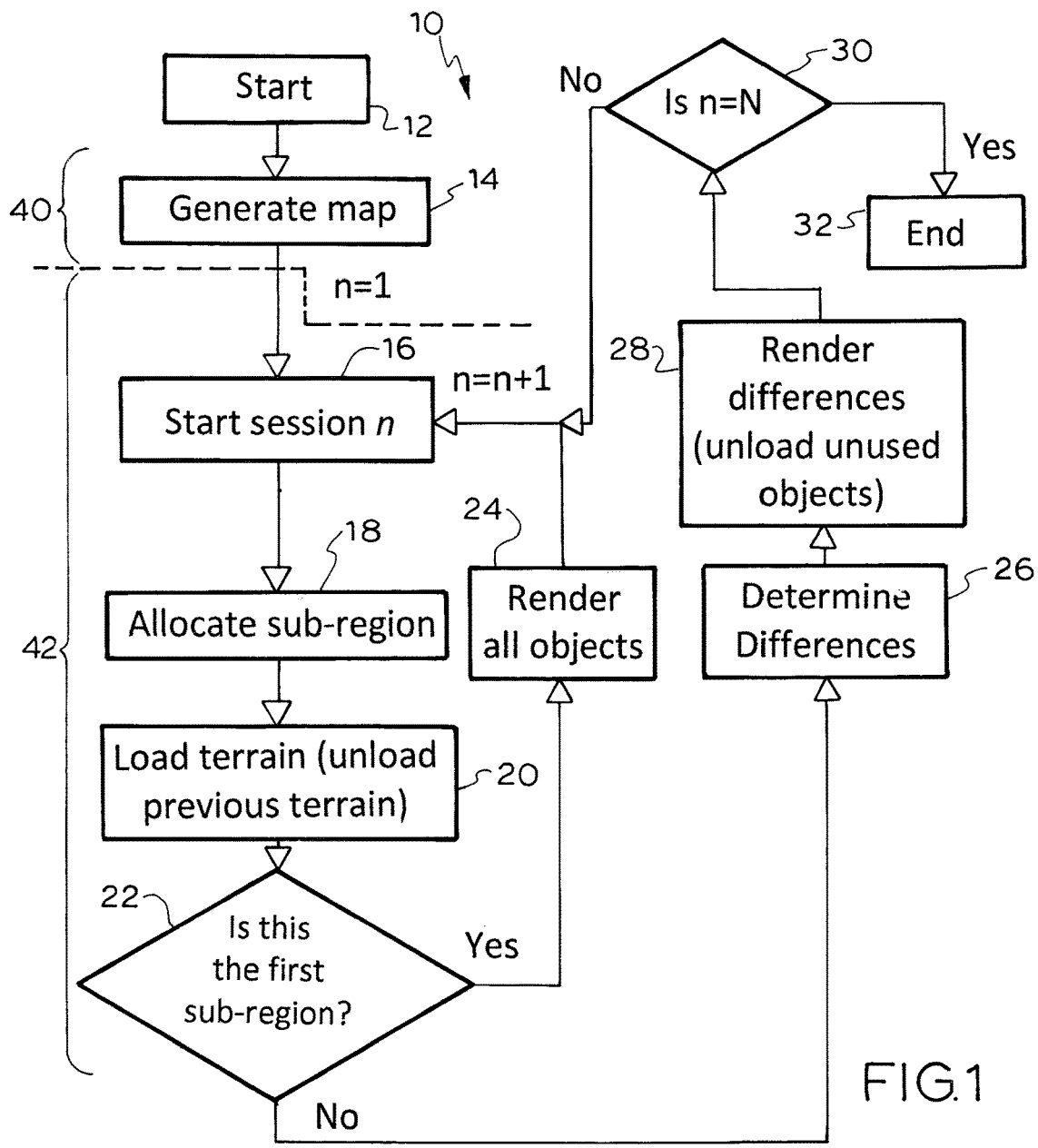
FIG. 1 is a flowchart showing a method for rendering an environment in an electronic game according to an embodiment.

The following detailed description is merely exemplary in nature and is not intended to limit the invention or the application and uses of the invention. Furthermore, there is no intention to be bound by any theory presented in the preceding background of the invention or the following detailed description.

It is the intent of certain embodiments to teach a method for rendering an environment in an electronic game, the game comprising a plurality of sessions. Such sessions may correspond to a level, room or area. A session is often characterized by continuous gameplay and, in this case, there is no or little opportunity for complex visual rendering as available computing resources are engaged in providing the resources necessary for the gameplay.

Embodiments concern the rendering of an environment. In the following discussion, the term rendering is generally used in the sense of providing visual details from stored parameters. In other words the game software will store certain information relating to elements which are to be displayed to a user during the gameplay. Rendering will then involve the computer carrying out the necessary calculations in order to display those elements to a user.

Certain embodiments involve, during an initiation phase, generating a map for all sessions of the game and dividing the map up into a plurality of sub-regions, each of the sub-regions being allocated to at least one session; and for each session, rendering a current sub-region of the map wherein the current sub-region corresponds to a current session.

Different sessions within a game provide novel aspects to the gameplay, presenting the user with a different environment within in which the gameplay occurs. By dividing a single map into a number of sub-regions, allocating those sub-regions to sessions and rendering the sub-region corresponding to the current session, embodiments may be able to divide the gameplay into a different sessions without the same computational overhead generally associated with multiple sessions. Since, in embodiments, multiple sessions may occur in the same map, the computationally expensive task of generating the map may be completed during the initiation phase only. In that case, switching between sessions may not require the same computational resources and this may result in a smoother gameplay experience.

The number of sessions in a game may be variable, depending on factors of gameplay. A sub-region may be allocated to more than one session or there may be a one-to-one relation between sub-regions and sessions so that each session is allocated a unique sub-region. In an embodiment, each game comprises between four and seven sessions, depending on gameplay. By using the same map divided up into sub-regions for all the sessions it may be possible to transition relatively smoothly between sessions. This may provide for a smooth playing experience and therefore enjoyment of the game, particularly where the number of sessions is not known at the start, and it is desirable to quickly switch between sessions.

Embodiments concern the generation of a map. The map may comprise a number of distinct visual elements which describe a portion of the information displayed to the user during gameplay. For example, the map may comprise terrain. Terrain may describe the geographic features incorporated into the map. For example, a terrain may include a landscape described by contours which identifies geographic features negotiated by a user's avatar during gameplay. Certain embodiments are applicable to scenes set indoors or in other locations to which a landscape comprising contours may apply. In an embodiment, such a landscape may describe walls or other architectural features to be negotiated by movement of an avatar through a space.

During an initiation phase, embodiments generate a map which may be used for multiple sessions of the game. The map is divided up into sub-regions and each of the sub-regions is allocated to at least one session.

By allocating a session to each sub-region, it may be possible to ensure that the game environment is different for each session. This may add to a user's enjoyment and appreciation of the gameplay experience by adding novel aspects to different sessions of the game.

In an embodiment, the sub-regions lie adjacent to one another in the map. In theory therefore, a user is able to move their avatar between sub-regions during gameplay. To avoid this various mechanisms may be used. For example, the user may be discouraged from moving into an adjacent sub-region by inflicting damage on the avatar if they cross a predetermined border. The predetermined border may be situated at the interface between adjacent sub-regions. In an alternative example, landscape features such as mountains or rivers which are impassable by avatars in the game may be used.

By preventing avatar movement between sub-regions, a user may be encouraged to complete a session before being exposed to the next session and the next sub-region. This may reinforce a user's sense of accomplishment in playing the game, and therefore enhance the user's overall enjoyment and appreciation of the game.

For each session, the corresponding sub-region of the map is rendered. In an embodiment, the rendering of the current sub-region comprises loading the terrain for that sub-region from a previously generated map and populating that terrain with objects. These objects are generally visual elements presented to the user during gameplay with some form of common characteristic. Often, the objects will correlate to representations of real objects such as vehicles, buildings, weapons, vegetation etc. Non-playing characters and other animated elements may also be considered objects and rendered in this phase.

Loading of a terrain for a sub-region may also comprise unloading (or over-writing) the terrain from a previous sub-region. In this manner, it may be possible to reduce the computational resources dedicated to loading and storing the terrain.

If the current sub-region is not the first region; in other words if the current sub-region being rendered corresponds to a session other than the first session, then embodiments may determine a difference between the current sub-region and a preceding sub-region. In certain embodiments, the difference is determined between the current sub-region and the sub-region immediately preceding the current sub-region.

Various embodiments may determine the difference in various ways. In one embodiment, the difference is determined with reference to the objects to be rendered. The difference may be determined with respect to one of more of the following: type of object; dimensions of an object; size of an object; location of an object; orientation of an object; visual characteristics of an object such as colour, shade, pattern, reflectivity, texture etc., and animation characteristics of an object.

By determining the differences between the current sub-region and a previous sub-region, embodiments are able to render only the new objects or the new characteristics of the previous characteristics. This may save computing resources by avoiding the need to perform unnecessary calculations.

There may be a one-to-one correlation between sub-regions and sessions so that each session is allocated a unique sub-region.

The step of rendering the current sub-region of the map may comprise populating the current sub-region with one or more objects.

The sessions may occur sequentially so that a second session occurs after a first session. The second session may be a second session out of all sessions or any subsequent session.

Where the current sub-region corresponds to a second session, the method may comprise determining a difference between the current sub-region and a previous sub-region and the step of rendering the current sub-region may comprise rendering according to the difference.

Where the step of rendering the current sub-region comprises populating the current sub-region with one or more objects, then only the objects which have changed between the previous session and the current session may be rendered.

The objects which have changed may comprise new objects and/or old objects with different details.

FIG. 1 is a flowchart showing a method 10 for rendering an environment in an electronic game according to an embodiment. The method illustrated in FIG. 1 shows steps executed when a game according to an invention is run on a computer. The game has a number of sessions where each session represents a portion of gameplay determined by certain criteria. For example in this embodiment, the game is an online multiplayer game involving two teams of users, each controlling their own avatar. It is the object of a session for one team to eliminate the avatars of the opposing team through the use of simulated combat. Once all the avatars of one of the teams have been eliminated, the session ends, and the gameplay moves onto the next session (unless the session is the last session).

In this embodiment the game has nine sessions. It is to be realised however that alternate embodiments may have a different number of sessions, and the number of sub-regions of the map will be allocated and assigned accordingly.

The method starts at block 12 and moves onto step 14 where a map is generated and divided into sub-regions. The results of this step are illustrated schematically at FIG. 2. The overall map is designated as 50 and is shown delineated by a dashed line. The map 50 is split up into nine sub-regions 52A, 52B, 52C, 52D, 52E, 52F, 52G, 52H and 52I and each of these sub-regions is allocated to a corresponding session. In this embodiment, sub-region 52A is allocated to session 1, sub-region 52B is allocated to session 2 and so forth through to sub-region 52I being allocated to session 9. In this embodiment, the map is chosen so that each of the sub-regions is of equal planar (i.e. not taking account of any terrain) surface area facilitated by the hexagonal shape of the sub-region. Furthermore, the map 50 is chosen so that the sub-regions are adjacent to one another and adjacent sub-regions share common borders.

Also in step 14, the terrain and skybox for the map is generated. In this embodiment the terrain is segmented. The manner in which terrain and the skybox are generated is known and will not be further described.

In this embodiment, step 14 takes place during an initiation phase 40. In other words, step 12 will be carried out near the start of loading the game and before gameplay commences.

The process then continues on to step 16. As shown, steps 16 through 30 describe a loop which is traversed for each session of the game and which occur in a gameplay phase 42. In this embodiment, the variable n is used to keep to track of the current session. Since the transition from step 14 to step 16 represents the first session, n is set to 1 and the first session starts at step 16.

During the first step of the current session (here session 1), the appropriate sub-region is allocated. In this embodiment, as previously discussed, sub-region 52A is allocated to session 1.

The process then proceeds to step 20 where the terrain for the map 50 which was generated in step 14 corresponding to sub-region 52A is loaded. If this were a session other than the first session, step 20 would also comprise unloading (or over-writing) the terrain for the preceding sub-region.

At the following step, step 22 a determination is made whether this is the first sub-region (or, in other words if n=1). If it is determined at step 22 that the current session and corresponding sub-region are the first session and sub-region, the process will proceed to step 24.

At step 24 all of the objects for the first sub-region are rendered. This process is described below with reference to FIGS. 3 and 4 but, briefly, involves populating the sub-region with the specified objects which may be any visual element located within this first sub-region and determining the visual characteristics of those objects. This process is well known in the art and will not be further described herein.

The process will then increment the value of n and return to step 16. So, for the first pass between steps 24 and 16, n will be incremented from 1 to 2, indicating that the current session is the second session and that the corresponding sub-region is 52B. The process with then proceed through loading the relevant terrain pertaining to sub-region 52 B at step 20.

When the process then proceeds to step 22, it will determine that the current sub-region and session are not the first sub-region and session and will then proceed to step 26. At step 26 a determination is made of a difference between the current session (which in this case is the second session) and the preceding session. In this embodiment, the difference pertains to the objects to be rendered. Therefore, the process will determine whether there are any objects from the rendering for the first session which are also to be rendered for the second session. Since an object comprises a number of characteristics such as, for example, size, location, colour and texture (to name a few), the determination of differences may establish that the object is the same but it is located at a different location and has a different size. This is described in further detail with reference to FIGS. 3 and 4 below.

Then, at step 28, the differences established in step 26 are rendered. Therefore, where there are similarities between what was rendered for the first session and what was rendered for the second session, the process will avoid having to re-render those elements, potentially saving the corresponding computing resources.

Further, at step 28, any unused objects or details are unloaded. By unloading unwanted objects from memory, embodiments may be able to free up computing resources which may, in turn, help to avoid an uneven gameplay experience.

Although the current embodiment considers the differences between the current session and the previous session, it is to be realised that other possibilities exist too. For example, if the computing resources are available, then the process may determine a type of session labelled according to the prevailing objects used. For example, sessions may include "Alpine Town" and "Downtown" sessions labelled according to characteristics of the type of sessions used. Then, the process may save the first of such type of session encountered, and determine the difference between a subsequent session of the same type with respect to the saved session. It is to be realised that in such an embodiment step 20 may involve saving the terrain rather than unloading it, where appropriate.

The process will then proceed to step 30 where a determination is made as to whether the current session (i.e. the value of n) is the final session (i.e. whether n=N, where N is the total number of sessions which in this embodiment is nine). If the current session is not the final session (and in the current description of the process, n is two), the process will increment n and return to step 16.

In this manner, the process will iterate through all the sessions until the last session (in this embodiment, the ninth session) is reached. At that point, the determination at step 30 will be that n does equal N, and the process will proceed to step 32 where it will terminate.

Figure 2:
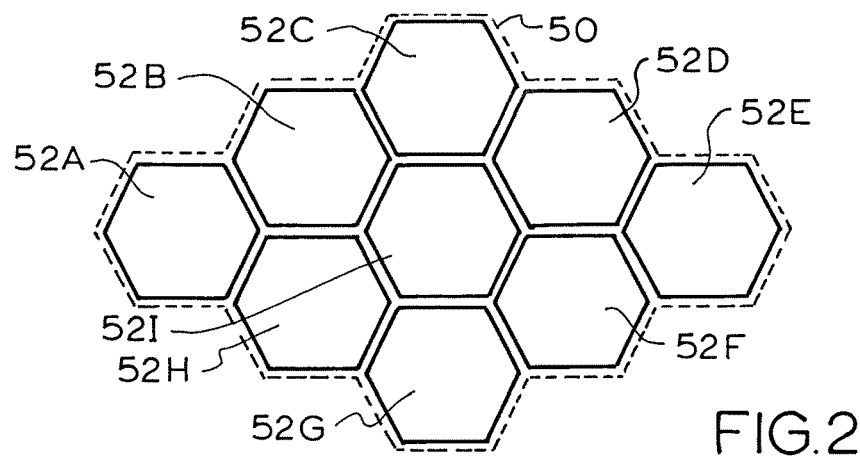
FIG. 2 illustrates a map used by an embodiment, the map being sub-divided into sub-regions.
Figure 3:
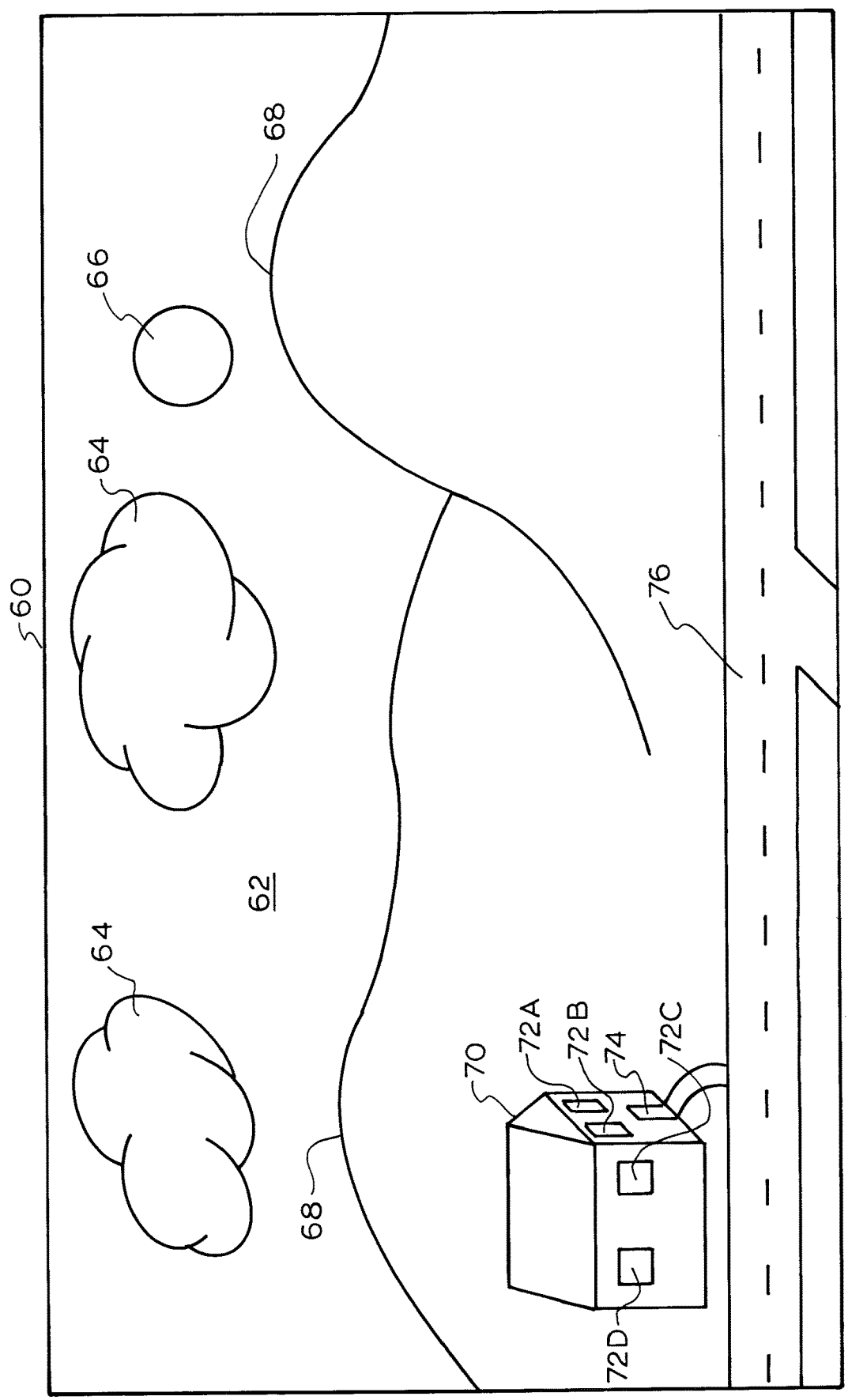
FIG. 3 illustrates a user view during gameplay of a first session of a game according to an embodiment.
Figure 4:
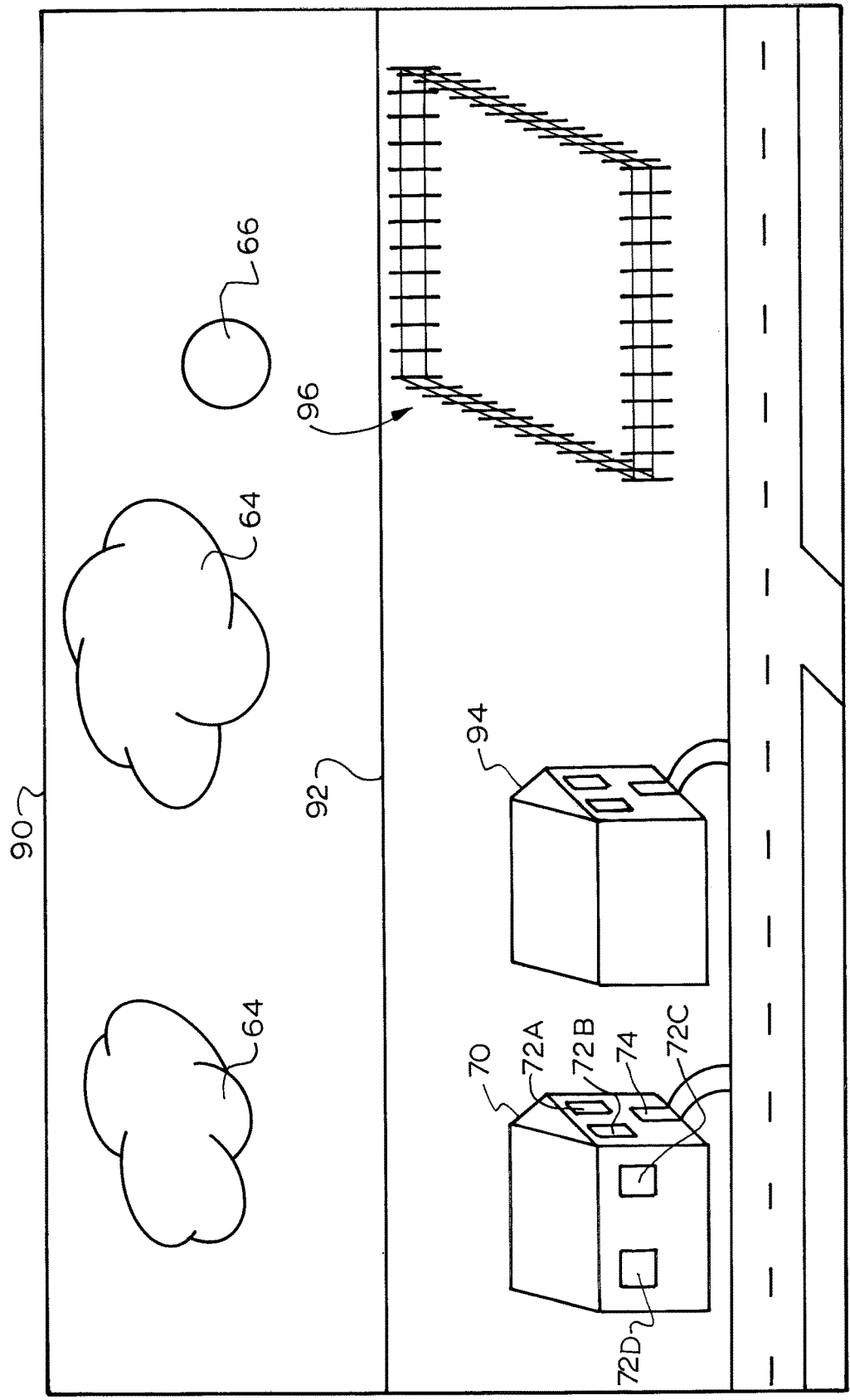
FIG. 4 illustrates a user view during gameplay of a second session of a game according to an embodiment.

FIGS. 3 and 4 illustrate idealised gameplay scenes from a game according to an embodiment to describe aspects of embodiments. FIG. 3 illustrates a scene 60 which has been rendered according to the process of FIG. 1 and described above. The scene 60 is a scene from the first session of the game and therefore is a view of the sub-region 52A (FIG. 2). Scene 60 includes depictions of sky 62, clouds 64, sun 66, mountains 68, a house 70 having windows 72A, 72B, 72C and 72D, and a door 74. The scene 60 further comprises a road 76.

The sky 62, clouds 64 and sun 66 form part of the "skybox" which is generated together with the map in step 14. These elements are common to all sessions and corresponding sub-regions and therefore, the corresponding rendering actions for these elements need only be carried out once, for the first session. For each subsequent session, the determination of differences (corresponding to step 26 of FIG. 1) will determine that these elements are the same, and therefore they will not be re-rendered.

The mountains 68 form part of the terrain which is generated in step 14. The terrain also stipulates the location and other characteristics of the other objects relative to the landscape. With reference to the scene 60 of FIG. 3, the house 70 and the road 76 are objects stipulated by the terrain. The windows 72A, 72B, 72C and 72D, and door 74, are characteristics of the house object 70 and the location and appearance of these are also stipulated as part of the terrain.

Since the scene illustrated in FIG. 3 corresponds to the first session, the objects in that scene will be rendered according to step 24. In other words the rendering of all the objects would proceed as is known.

FIG. 4 illustrates a scene 90 for the second session of the game. In other words, the first session of scene 60 of FIG. 3 has ended and the second session has started. In this case, the terrain corresponds to sub-region 52B of the map 50 of FIG. 2. At step 20 for the second session, the terrain is loaded from the map 50. In this instance, the landscape specified by the terrain is flat, comprising a straight horizon 92. Since the skybox remains the same, this scene will also have clouds 64 and sun 66.

The scene 90 further comprises a house 70, house 94 and a paddock 96. Since the scene 90 corresponds to the second session, when the process of FIG. 1 runs through step 22 a determination will be made that this is not the first session and the process will proceed to step 26 where the differences between the objects for the first session and the second session are determined. The house 70 is the same house at the same location as the house 70 of scene 60 shown in FIG. 3. The house 94 is similar to the house 70 of scene 60 but is located in a different position, and does not have windows in one wall. The paddock 96 is a new object.

Therefore, at step 26 these differences are determined, and then at step 28 the differences are rendered to establish the scene 90 for this session. In this case, all rendering calculations for the house 70 can be reused since that object remains. For the house 94 many of the rendering calculations used for house 70 can be reused with the appropriate modifications. For the paddock 96, the entire object will be rendered in this session since it is a new object.

In this manner then, it may be possible to save a number of computing resources by avoiding rendering calculations for objects, or aspects of objects which are repeated between scenes.

Since the scene 90 of FIG. 4 (which corresponds to sub-region 52B of map 50) lies adjacent to scene 60 of FIG. 3 (which corresponds to sub-region 52A of map 50), it may be desirable to prevent movement of users' avatars between the scenes. In this embodiment, this is achieved by establish a virtual barrier between the scenes which will impart damage to the user's avatar if they move the avatar to that location. The damage will be inflicted until they move away from the barrier. In this way, the user will be discouraged from moving to an adjacent sub-region and the damage may be calibrated so that it is, in fact, not possible to move the avatar past the barrier.

In other embodiments, different barriers may be used such as impassable landscape features or architecture.

The present invention may be implemented in a game that may be operable using a variety of devices or game systems. For example, a device may be a personal computer, a home entertainment system, a portable gaming device, or a mobile computing device. The present methodologies described herein are fully intended to be operable on a variety of devices or game systems. Any hardware platform suitable for performing the methodologies described here is suitable for use with the invention. Computer-readable storage media refer to any medium or media that participate in providing instructions to a CPU for execution. Such media can take many forms, such as but not limited to, non-volatile and volatile media including optical or magnetic disks and dynamic memory, respectively. Common forms of computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Unless specifically stated otherwise, and as apparent from the following, it will be appreciated that throughout the present specification, discussions utilizing terms such as "receiving", "identifying", "initiating", "tagging", "transmitting", "running", "incrementing", "determining", "assigning", "approving", "selecting", "sending", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

In the application, unless specified otherwise, the terms "comprising", "comprise", and grammatical variants thereof, intended to represent "open" or "inclusive" language such that they include recited elements but also permit inclusion of additional, non-explicitly recited elements.

It will be apparent that various other modifications and adaptations of the application will be apparent to the person skilled in the art after reading the foregoing disclosure without departing from the spirit and scope of the application and it is intended that all such modifications and adaptations come within the scope of the appended claims.

The invention claimed is:

1. A method for rendering an environment in an electronic game, the game comprising a plurality of sessions, the method comprising:
    during an initiation phase, generating a map for all sessions of the game and dividing the map up into a plurality of sub-regions, each of the sub-regions being allocated to at least one session;
    for each session, rendering a current sub-region of the map wherein the current sub-region corresponds to a current session; and
    for each session subsequent to a first session, the step of rendering the current sub-region comprises determining a difference between the current sub-region and a previous sub-region, and rendering the current sub-region according to the difference.

2. The method according to claim 1 comprising establishing a one-to-one correlation between sub-regions and sessions so that each session is allocated a unique sub-region.

3. The method according to claim 1 wherein the step of rendering the current sub-region of the map comprises populating the current sub-region with one or more objects.

4. The method according to claim 1 wherein the sessions occur sequentially so that a second session occurs after a first session.

5. The method according to claim 1 wherein the step of rendering the current sub-region comprises populating the current sub-region with one or more objects and the step of rendering according to the difference comprises rendering only the objects which have changed between the previous session and the current session.

6. The method according to claim 5 wherein the objects which have changed comprise new objects and/or old objects with different details.

7. The method according to claim 6 wherein details of objects may include one or more of level of detail, texture, pattern, shadows and motion blur.

8. The method of claim 6 wherein the objects are animate and/or inanimate objects.

9. The method according to claim 1 wherein the map comprises a skybox and a terrain together with descriptors of objects on the terrain.

10. The method according to claim 9 wherein the descriptors of objects on the terrain may describe one or more of: type of the object; dimensions of the object; size of the object; location of the object; orientation of the object; visual characteristics of the object such as colour, shade, pattern, reflectivity, texture etc., and animation characteristics of the object.

11. The method according to claim 9 wherein the terrain comprises a description of a landscape used in the game.

12. The method according to claim 1 wherein the map comprises predetermined aspects as well as randomly generated aspects.

13. The method according to claim 1 wherein the sub-regions are adjacent to one another.

14. The method according to claim 13 wherein users are discouraged from accessing a sub-region which is not allocated to the current session.

15. A system comprising one or more computers and one or more storage devices storing computer-readable instructions that, when executed by the one or more computers, cause the one or more computers to perform the method of claim 1.

16. One or more non-transitory computer storage media storing instructions that, when executed by one or more computers, cause the one or more computers to perform the method of claim 1.

* * * * *